(12) United States Patent
Williams

(10) Patent No.: US 7,744,417 B2
(45) Date of Patent: Jun. 29, 2010

(54) AIRCRAFT WIRING INSTALLATION

(75) Inventor: Stephen Williams, Bristol (GB)

(73) Assignee: Airbus Operations Limited, Bristol (GB)

( * ) Notice: Subject to any disclaimer, the term of this patent is extended or adjusted under 35 U.S.C. 154(b) by 90 days.

(21) Appl. No.: 12/293,461

(22) PCT Filed: Mar. 21, 2007

(86) PCT No.: PCT/GB2007/000983

§ 371 (c)(1),
(2), (4) Date: Sep. 18, 2008

(87) PCT Pub. No.: WO2007/128953

PCT Pub. Date: Nov. 15, 2007

(65) Prior Publication Data

US 2009/0209129 A1 Aug. 20, 2009

(30) Foreign Application Priority Data

May 4, 2006 (GB) .................................. 0608832.2

(51) Int. Cl.
*H01R 13/648* (2006.01)
(52) U.S. Cl. ............................................... 439/607.12
(58) Field of Classification Search ............ 439/607.12, 439/254, 76.1, 540.1; 361/284
See application file for complete search history.

(56) References Cited

U.S. PATENT DOCUMENTS

| 3,609,632 | A | | 9/1971 | Vetter | |
|---|---|---|---|---|---|
| 3,757,276 | A | * | 9/1973 | Kailus | 439/607.12 |
| 3,798,515 | A | | 3/1974 | DiGiacomo | |
| 4,407,552 | A | * | 10/1983 | Watanabe et al. | 439/607.12 |
| 5,030,116 | A | * | 7/1991 | Sakai et al. | 439/130 |
| 5,378,956 | A | * | 1/1995 | Salzmann et al. | 313/141 |
| 6,083,015 | A | * | 7/2000 | Vargas et al. | 439/130 |
| 6,503,098 | B2 | * | 1/2003 | Aoki et al. | 439/502 |

FOREIGN PATENT DOCUMENTS

| EP | 0766361 A1 | 4/1997 |
|---|---|---|
| EP | 1473226 A1 | 11/2004 |
| EP | 1749742 A2 | 2/2007 |
| GB | 2292267 | 2/1996 |
| WO | 2006/013351 A1 | 2/2006 |

OTHER PUBLICATIONS

UK Search Report for GB0608832.2 dated Aug. 4, 2006.
ISR and Written Opinion for PCT/GB2007/000983 mailed Aug. 2, 2007.

* cited by examiner

*Primary Examiner*—Chandrika Prasad
(74) *Attorney, Agent, or Firm*—Lowe Hauptman Ham & Berner LLP

(57) ABSTRACT

An aircraft wiring installation connecting a set of fuel side wires in an aircraft fuel tank to a set of airside wires outside the fuel tank, the installation comprising: a connector box having a fuel side wall (22) and an airside wall (21); one or more connectors (40, 43) carried by the fuel side wall (22) which connect the fuel side wires to the airside wires; a fairing (6) partially covering the airside wall (21); and one or more holes (30) in the airside wall through which the airside wires pass from the connector box into the fairing (6).

14 Claims, 11 Drawing Sheets

US 7,744,417 B2

AIRCRAFT WIRING INSTALLATION

RELATED APPLICATIONS

The present application is based on International Application Number PCT/GB2007/000983 filed Mar. 21, 2007, and claims priority from, British Application Number 0608832.2, filed May 4, 2006, the disclosures of which are hereby incorporated by reference herein in their entirety.

FIELD OF THE INVENTION

The present invention relates to an aircraft wiring installation connecting a set of fuel side wires in an aircraft fuel tank (typically in a wing of the aircraft) to a set of airside wires outside the fuel tank.

BACKGROUND OF THE INVENTION

Conventional aircraft wiring installations of this type pass the wires through exit holes in a spar of the wing. The exit holes weaken the spar, particularly if the spar is formed from a composite material.

SUMMARY OF THE INVENTION

A first aspect of the invention provides an aircraft wiring installation connecting a set of fuel side wires in an aircraft fuel tank to a set of airside wires outside the fuel tank, the installation comprising: a connector box having a fuel side wall and an airside wall; one or more connectors carried by the fuel side wall which connect the fuel side wires to the airside wires; a fairing partially covering the airside wall; and one or more holes in the airside wall through which the airside wires pass from the connector box into the fairing.

The first aspect of the invention provides a wiring installation which can be fitted to an external wall of the fuel tank (that is, not the spar), thus avoiding the problem of spar weakening. The problem of partial coverage by the fairing is solved by the provision of a connector box with an airside wall and a fuel side wall. The gap between the airside and fuel side walls can then accommodate the connector(s), which typically connect the wires by means of a plug and socket fitting.

Typically the connector box is removably fitted in a wall of the aircraft fuel tank. Typically the connector box is a manhole, and the airside wall has a minimum width which is greater than 200 mm and a maximum width which is greater than 400 mm. This enables the connector box to perform dual purposes: the provision of a wiring installation and also the provision of access to the interior of the fuel tank.

Typically the fuel side wall of the connector box is detachably fitted to the rest of the connector box. This makes assembly of the installation easier because the fuel side wall can be fitted to the rest of the connector box after connecting the airside wires to the fuel side wires and after fitting the connector(s) to the fuel side wall of the connector box.

The fairing may be an existing fairing such as a flap fairing, or a dedicated fairing for covering the airside wires only.

The fuel side wires are typically data wires, such as wires connected to strain gauges in the fuel tank.

A second aspect of the invention provides a method of connecting a set of fuel side wires in an aircraft fuel tank to a set of airside wires outside the fuel tank, the method comprising: fitting a connector box to a hole in the fuel tank, the connector box having a fuel side wall and an airside wall; connecting the airside wires to the fuel side wires using one or more connectors; fitting the connector(s) to the fuel side wall of the connector box; passing the airside wires through one or more holes in the airside wall of the connector box; and fitting a fairing which covers the hole(s) and the airside wires and partially covers the airside wall of the connector box.

A third aspect of the invention provides a connector box for connecting a set of fuel side wires in an aircraft fuel tank to a set of airside wires outside the fuel tank, the connector box having a first wall and a second wall; one or more connectors carried by the first wall for connecting the fuel side wires to the airside wires; and one or more holes in the second wall through which the airside wires can pass from the connector box into a fairing.

BRIEF DESCRIPTION OF THE DRAWINGS

An embodiment of the invention will now be described with reference to the accompanying drawings, in which.

DETAILED DESCRIPTION OF EMBODIMENT(S)

Figure 1:
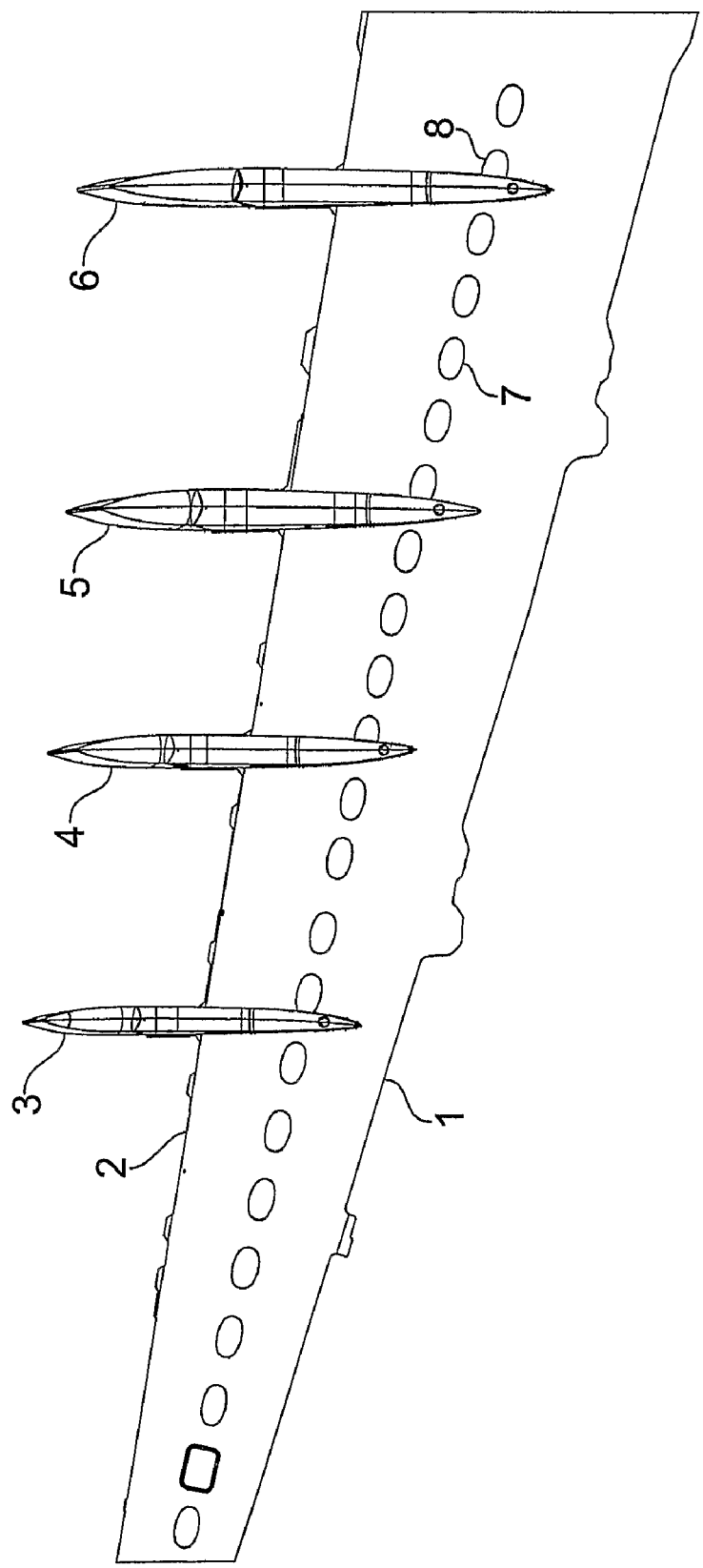
FIG. 1 is a bottom view of part of a left hand wing of an aircraft.
Figure 2:
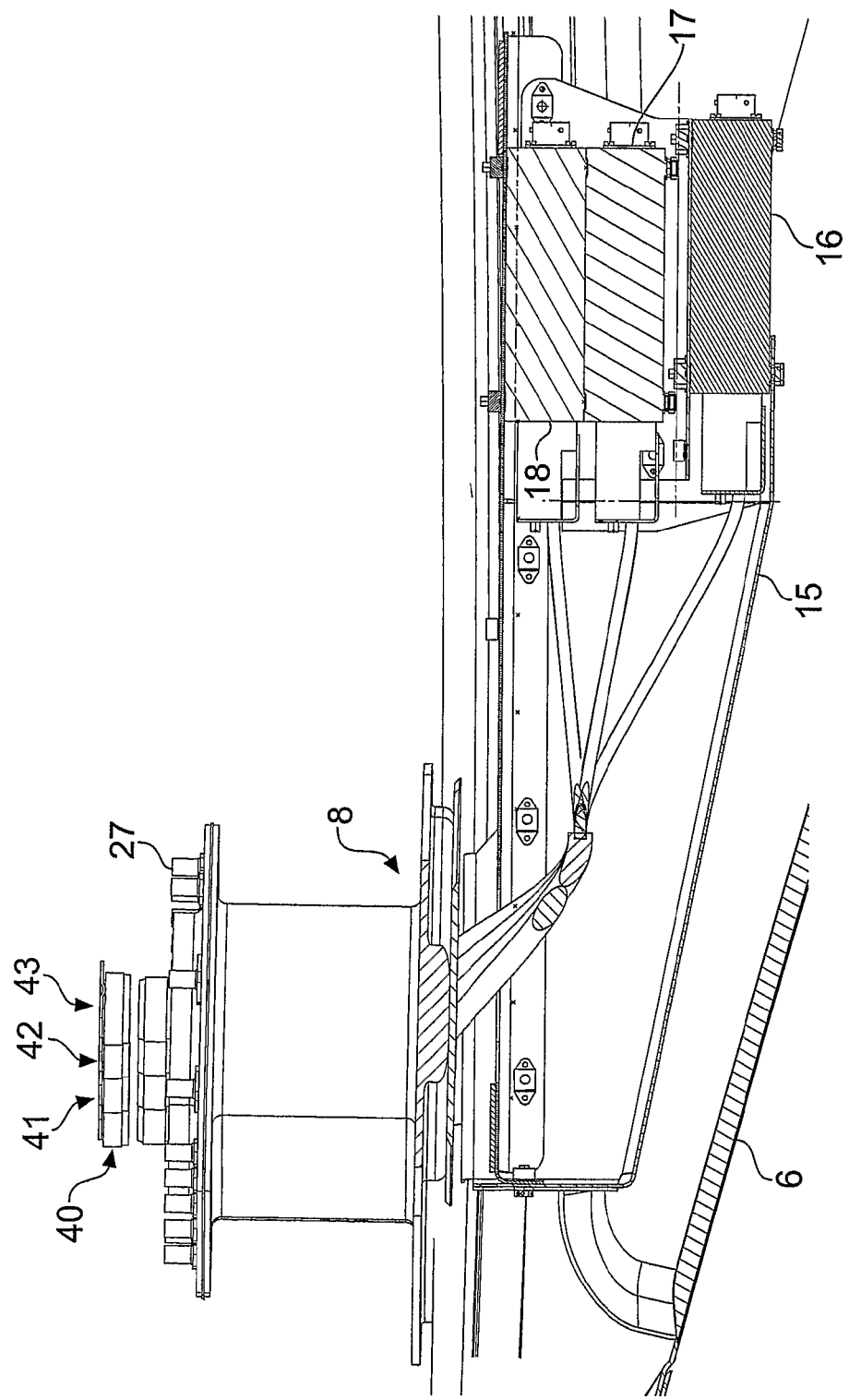
FIG. 2 is a first sectional side view showing a wiring installation.
Figure 3:
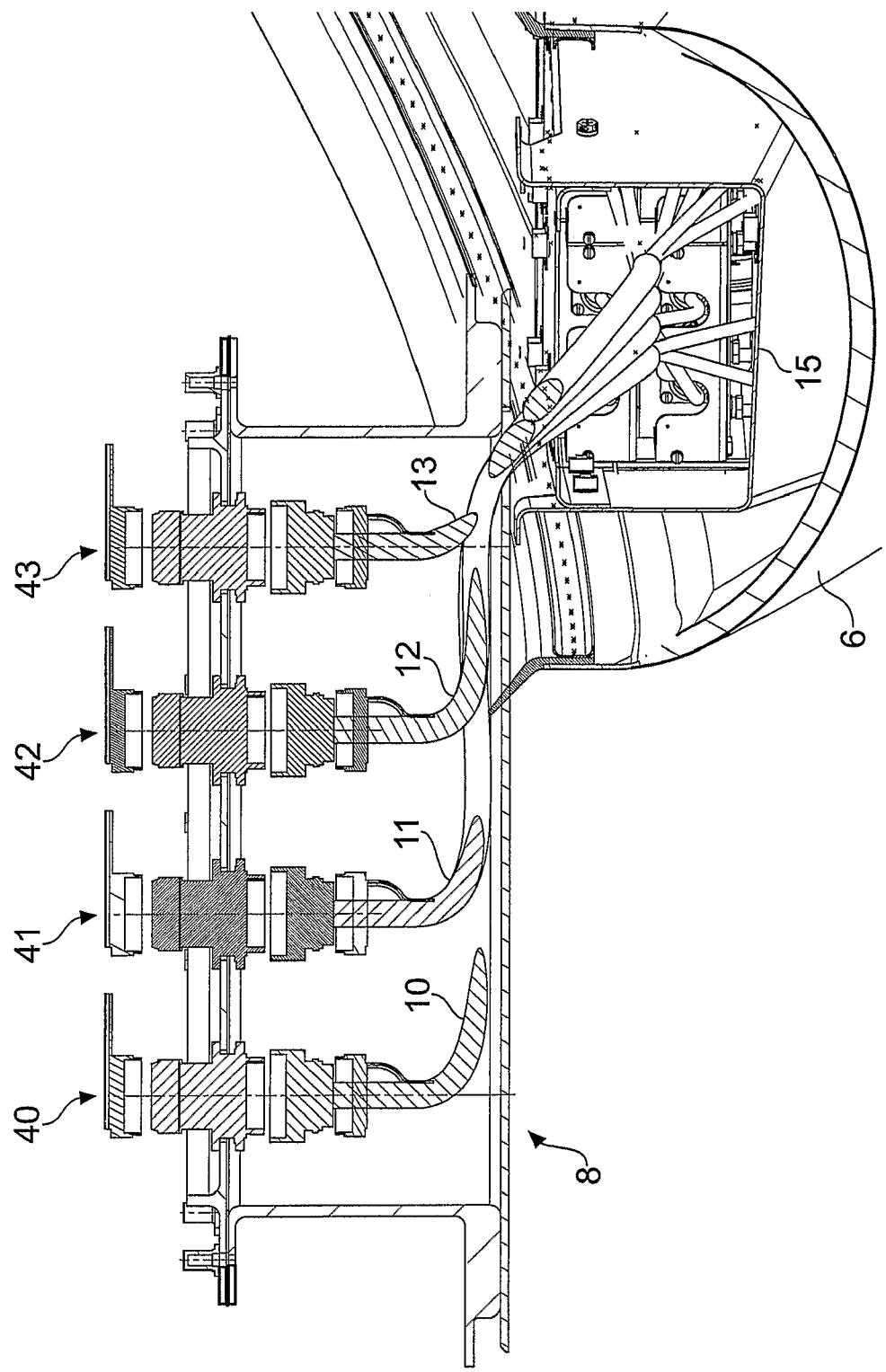
FIG. 3 is a second sectional side view of the installation.
Figure 4:
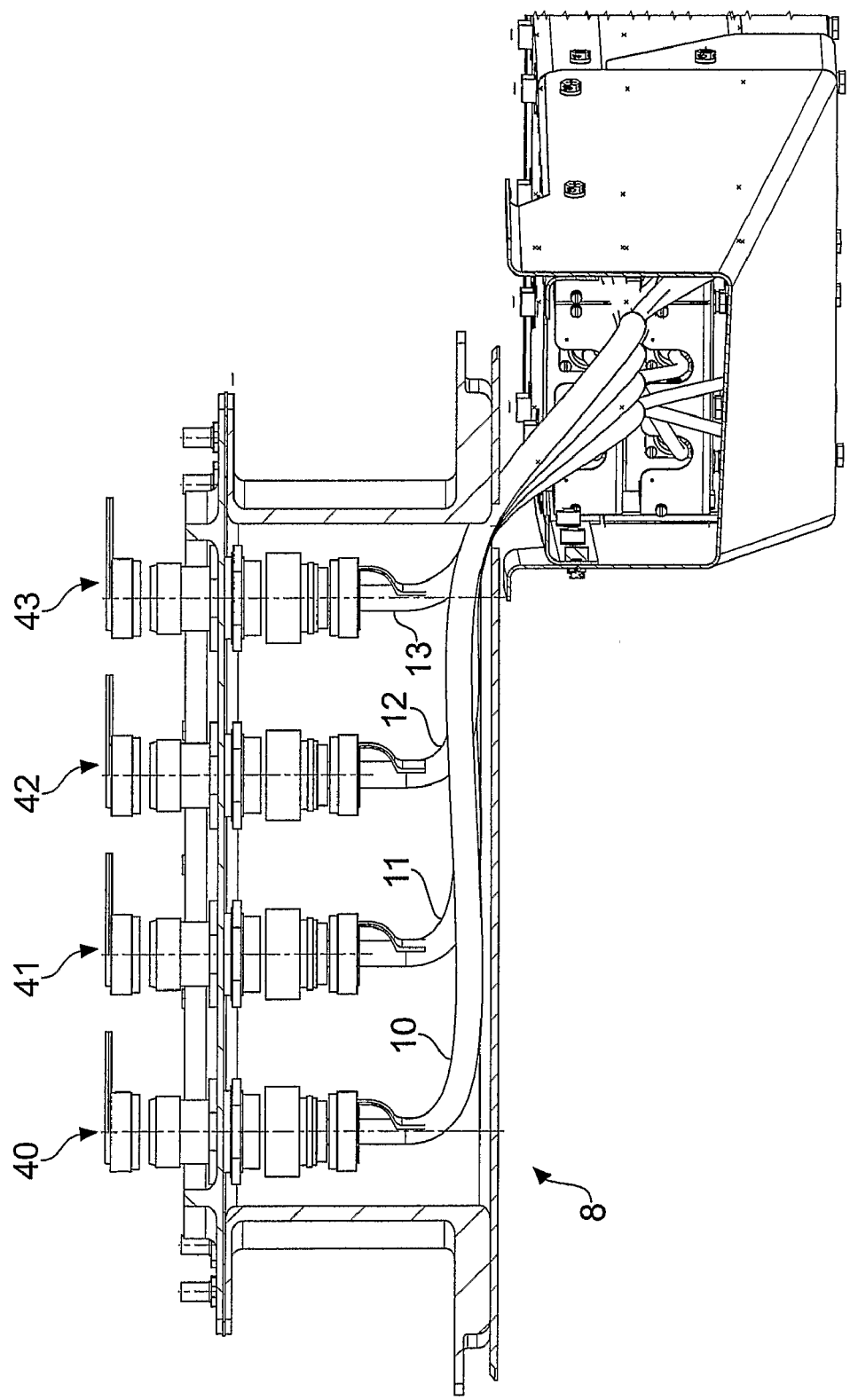
FIG. 4 is a third sectional side view of the installation.
Figure 5:
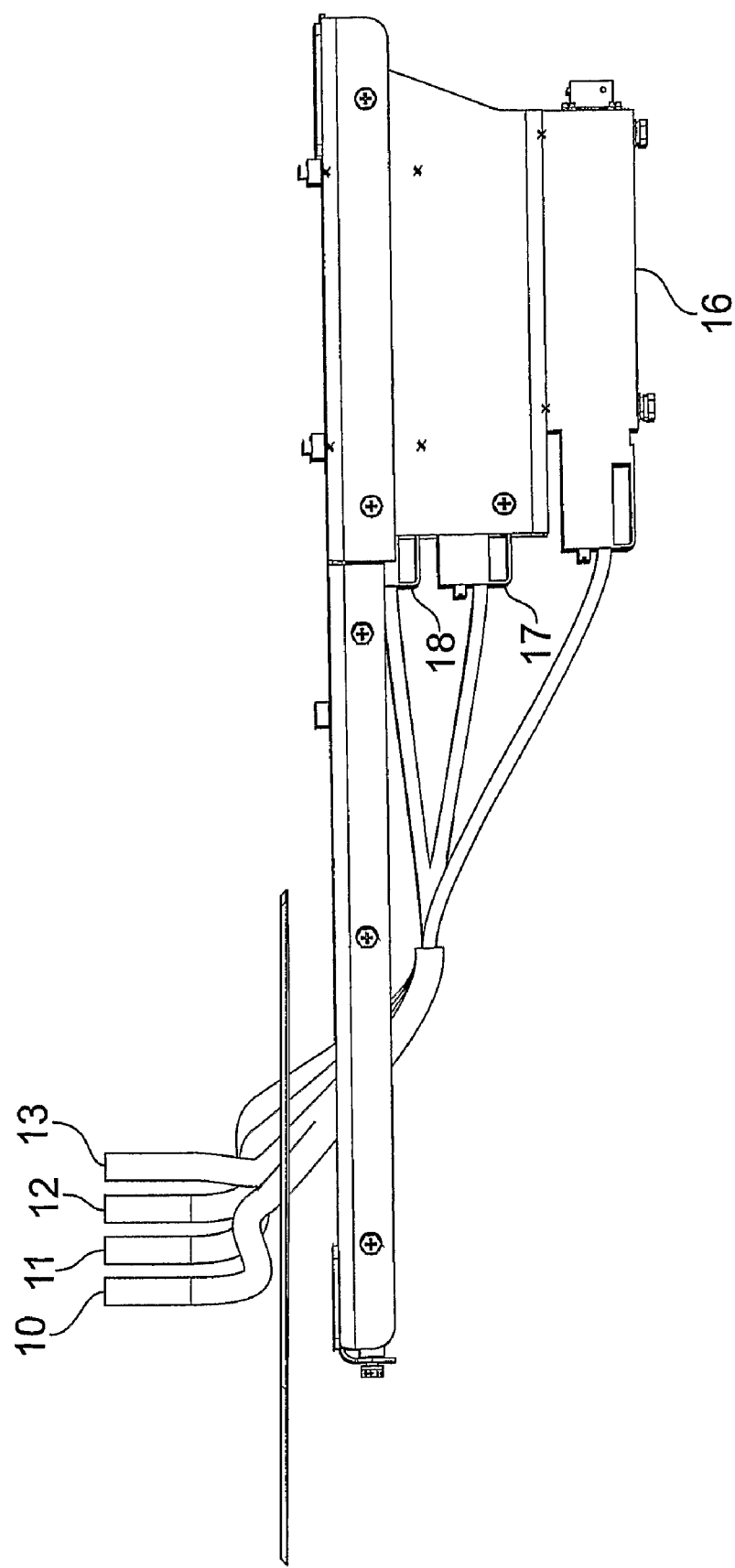
FIG. 5 is a side view of the barrier boxes.
Figure 6:
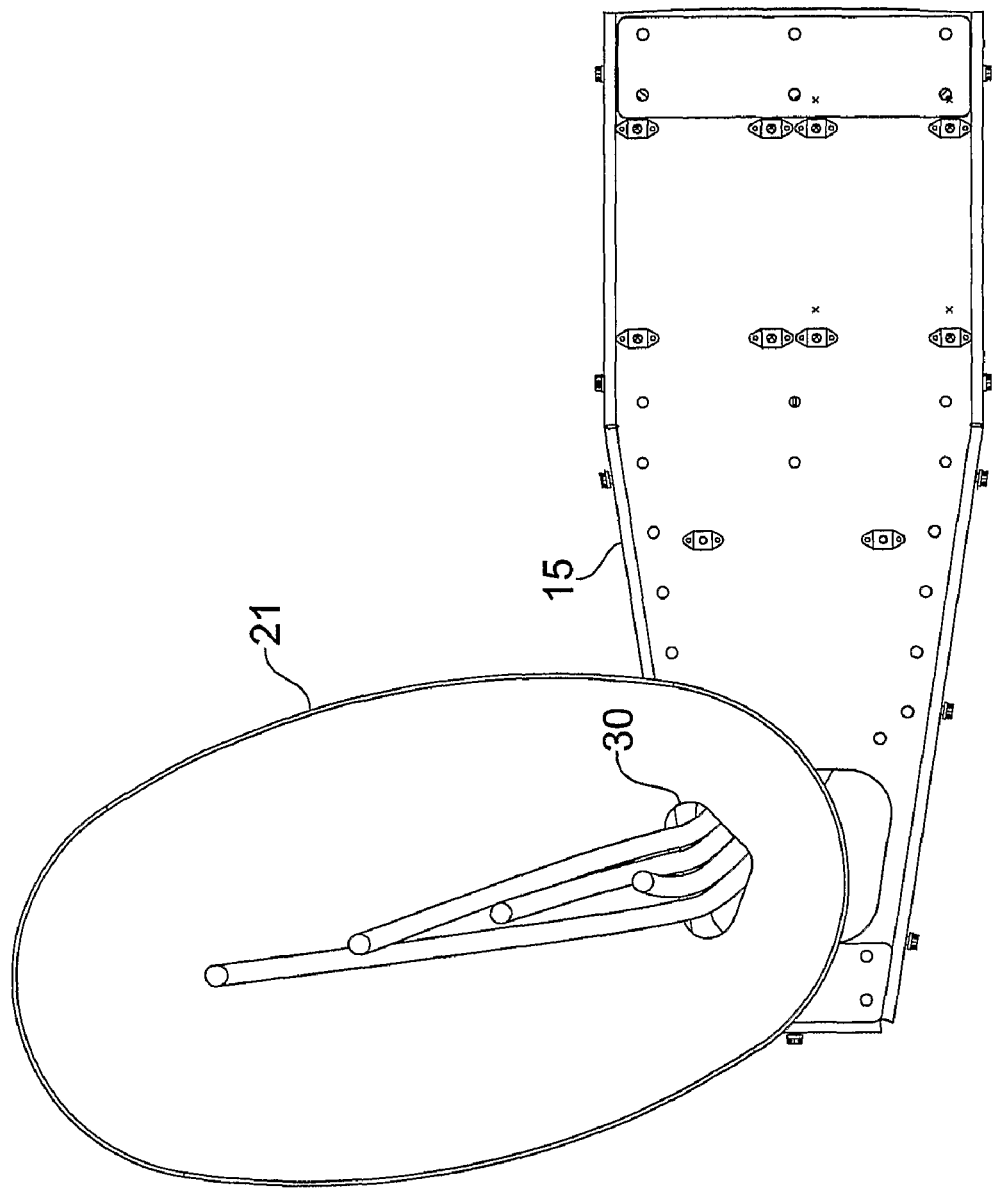
FIG. 6 is a top view of the installation.
Figure 7:
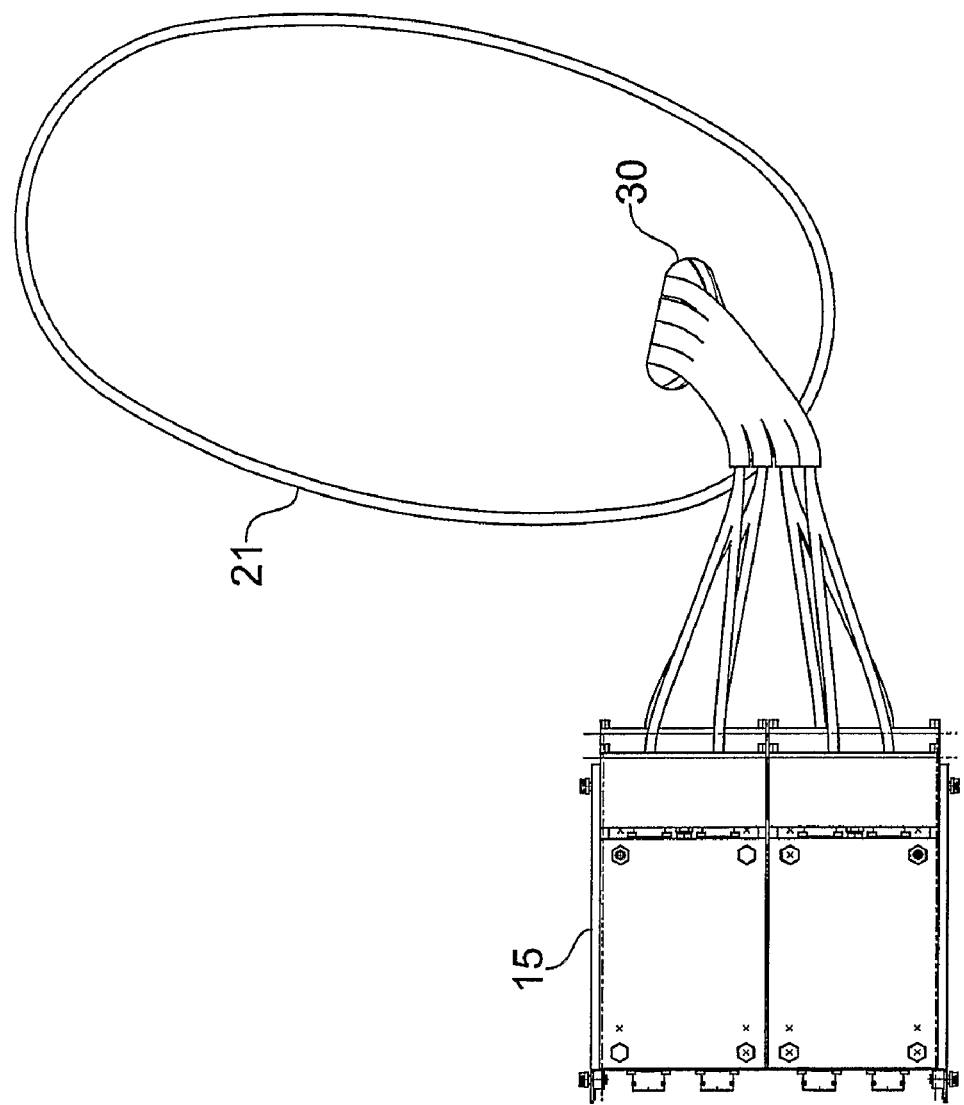
FIG. 7 is a bottom view of the installation.

FIG. 1 shows the bottom of part of a left hand aircraft wing having a leading edge 1 and trailing edge 2. A set of flaps (not shown) is connected to the trailing edge 2 and mounted to flap attachments (not shown), each flap attachment being covered by a respective flap fairing 3-6. The wing has a series of ribs (not shown) running between fore and aft spars (also not shown). Each space between an adjacent pair of ribs can be accessed by a respective manhole, a line of twenty three such manholes being shown in FIG. 1. The manholes are sized to enable a person to gain access to the interior of the wing, and typically having a spanwise width of about 500 mm and a chordwise width of about 250 mm. Some of the manholes are fully accessible (an example being labelled 7 in FIG. 1). Other manholes are partially covered by flap fairings, an example being labelled 8 in FIG. 1.

The wing houses a number of fuel tanks (not shown). Each fuel tank has walls defined by the upper and lower skins of the wing, a pair of wing ribs, and the fore and aft spars. During flight testing of the aircraft, strain gauges are mounted on the internal surfaces of the fuel tank walls and flight test wiring is lead from the strain gauges into computers housed in the fuselage of the aircraft. Traditionally, such flight test wiring passes from the fuel tank through holes in a spar of the wing. However, a composite spar may be unduly weakened by such holes. To solve this problem, each manhole which is partially covered by a flap fairing is specially adapted to pass the flight test wiring from a fuel tank into the fairing. Thus in the wing of FIG. 1 there are four manhole wiring installations, all of a similar design. An exemplary wiring installation associated with the first flap fairing 6 will now be described with reference to FIGS. 2-12.

The installation connects airside wiring (that is, wiring outside the fuel tank) to fuel-side wiring (that is, wiring inside the fuel tank) via a set of connectors 40-43. The airside wiring comprises four looms 10-13 shown most clearly in FIGS. 3 and 4. Each loom comprises a set of forty eight wires (not shown) covered by an outer shield. Each loom 10-13 is connected to a respective barrier box, three of the barrier boxes being labelled 16-18 in FIGS. 2 and 5. The barrier boxes are covered by a barrier box casing 15. The function of the barrier boxes is to protect the wiring in the tank from current induced by lightning, static, or other current sources.

Figure 8:
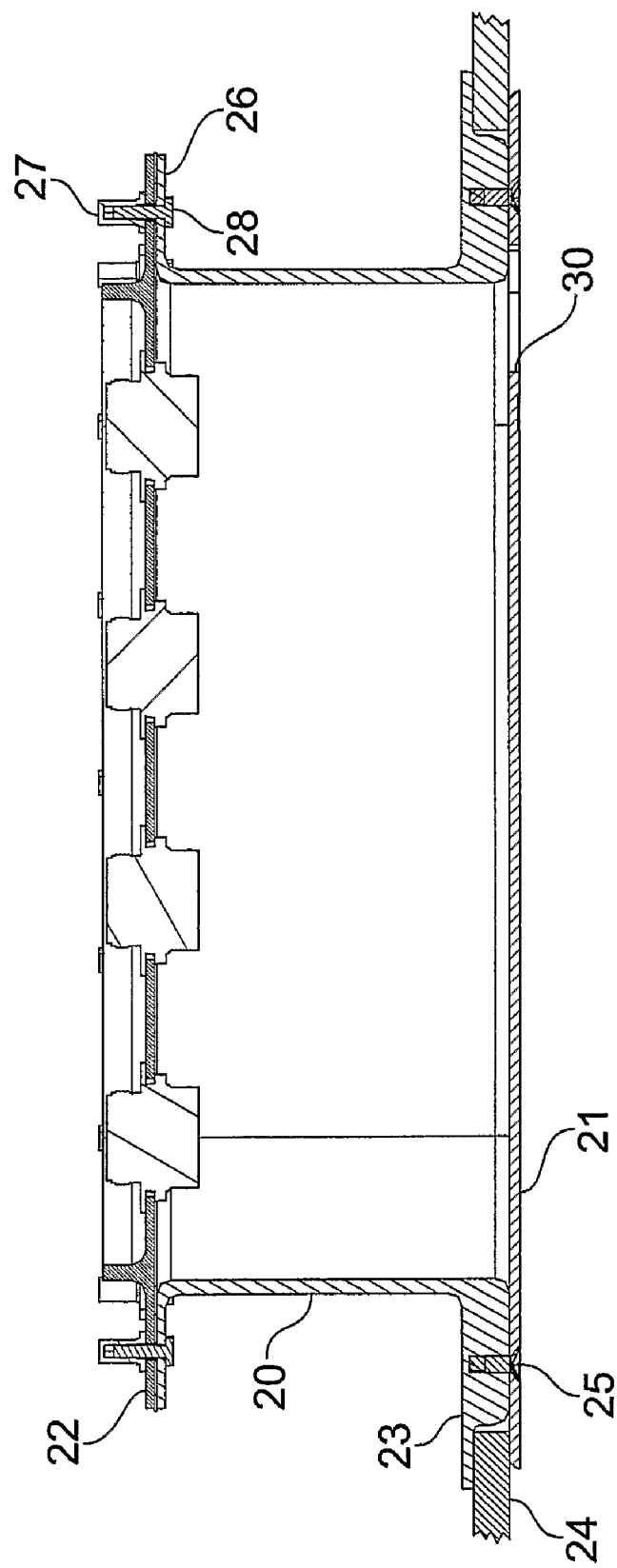
FIG. 8 is a sectional side view of the connector box.

The connectors 40-43 are mounted to a connector box manhole which is detachably fitted to a hole in the lower skin 24 of the wing as shown most clearly in FIG. 8. The connector box manhole comprises a cylindrical body 20 with a pair of flanges 23, 26, a fuel side wall 22 and an airside wall 21. The looms 10-13 pass into the fairing 6 through a hole 30 formed in the airside wall 21, as shown most clearly in FIGS. 6 and 7.

Figure 9:
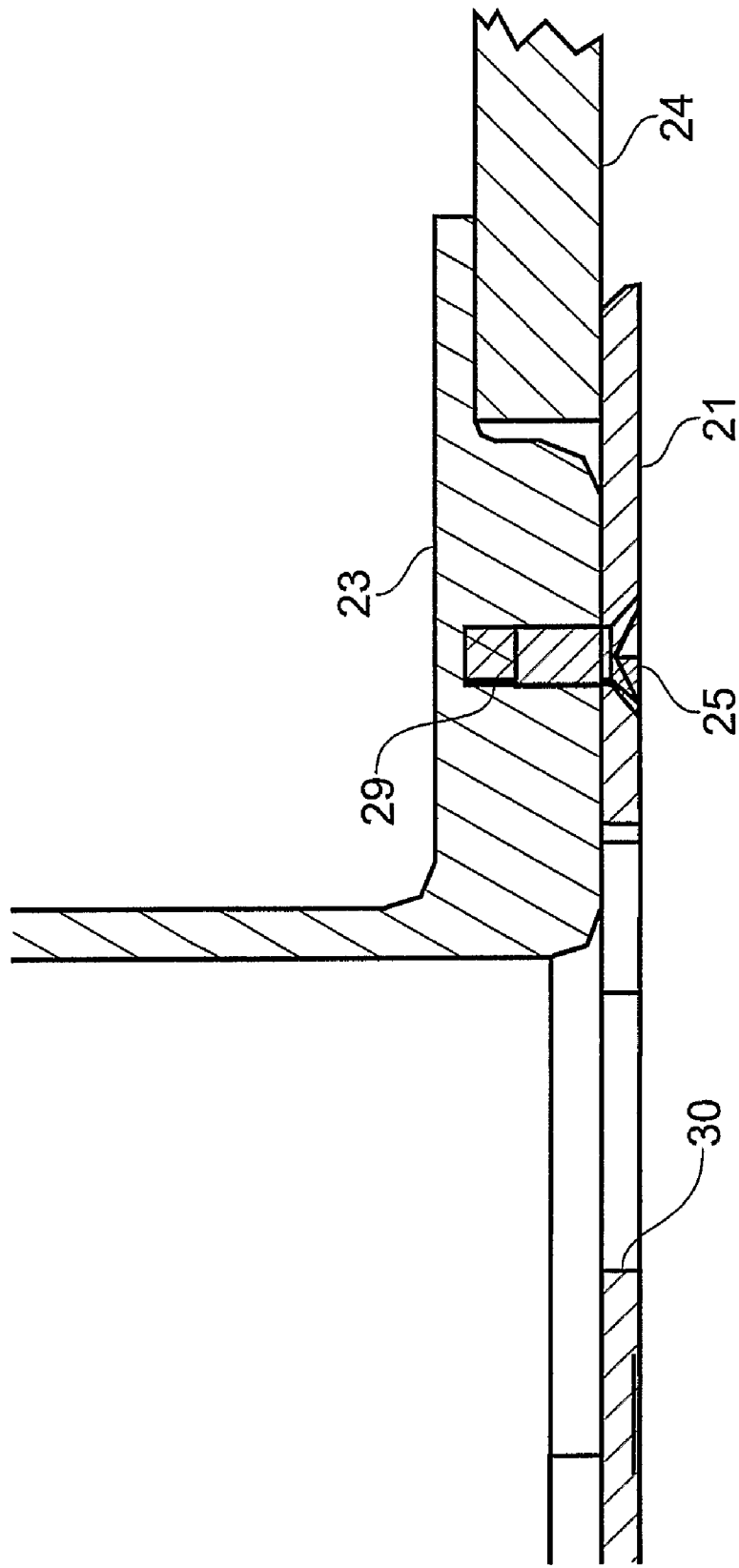
FIG. 9 is an enlarged sectional view showing the coupling between the connector box and the wing skin.

The flange 23 has a series of threaded blind bores arranged around its circumference, one of the blind bores being labelled 29 in FIG. 9. The lower skin 24 of the wing is clamped between the airside wall 21 and the flange 23 by screws 25 which are screwed into the blind bores 29 through holes in the airside wall 21. The fuel side wall 22 is detachably fitted to the body 20 of the connector box manhole by screws 28 which are screwed into caps 27 through holes in the fuel side wall 22.

Figure 10:
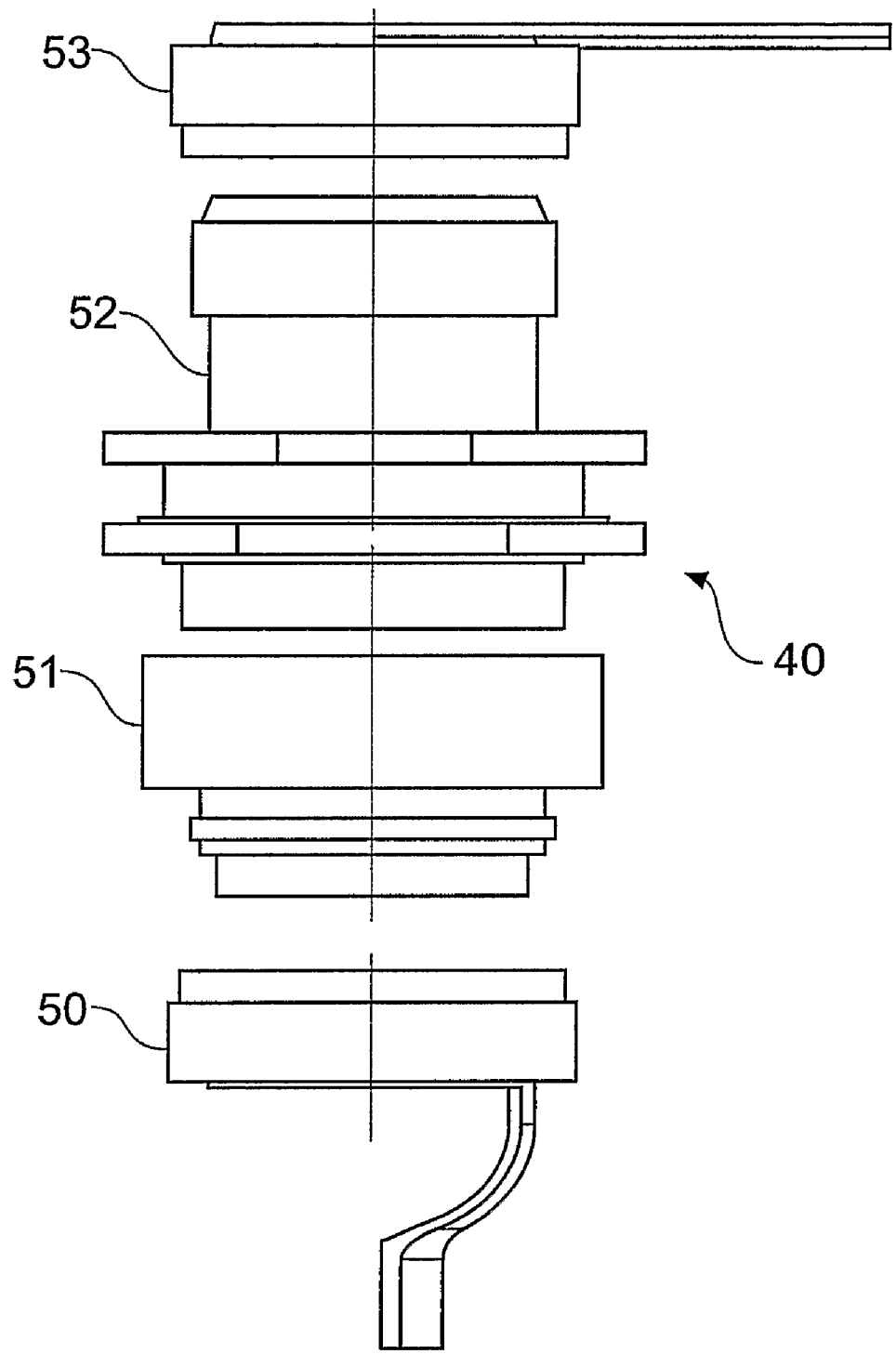
FIG. 10 is an exploded side view of one of the connectors.
Figure 11:
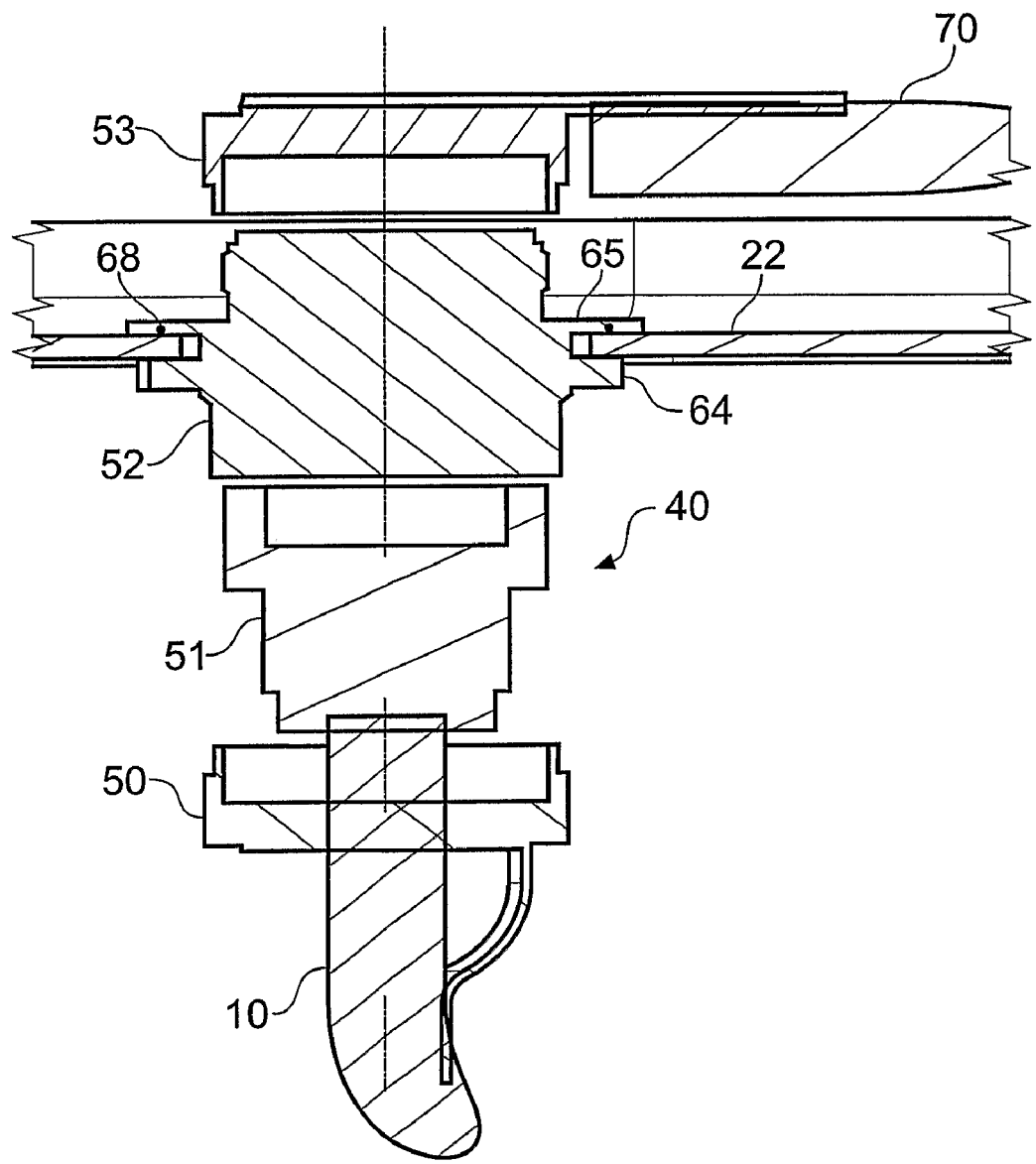
FIG. 11 is a schematic sectional side view of one of the connectors as installed.

FIGS. 10 and 11 show an exemplary one of the connectors 40. A fuel side loom 70 shown in FIG. 11 has forty eight wires (not shown) which are stripped and fitted to pins by crimping. The wires are passed through a fuel side backshell 53 and the pins are inserted into a complementary set of sockets (not shown) in the upper face of a fixed connector 52. The backshell 53 is formed in two parts: a body portion shown in FIGS. 10 and 11 and an internally threaded collar (not shown). After the wires have been connected to sockets in the upper face of the fixed connector 52, the collar is screwed onto an external thread (not shown) on the fixed connector 52, thus providing strain relief for the joint between the wires and the fixed connector 52.

The fixed connector is then fitted to the fuel side wall 22 as shown in FIG. 11. The fixed connector 52 has a flange 65 which bears against the fuel side surface of the fuel side wall 22 as shown in FIG. 11. A nut 64 is then screwed against the airside surface of the fuel side wall 22, to clamp the fuel side wall 22 firmly between the flange 65 and the nut 64. A fluid-tight seal is ensured by an O-ring 68 in the flange 65 which bears against the fuel side surface of the wall 22. A wet-assembly sealant may also be smeared over the junction between the flange 65 and the wall 22.

An airside loom 10 shown in FIG. 11 is fitted to a free plug 51 in a similar manner to the joint between the fuel side loom 70 and the fixed connector 52. That is, the loom 10 has forty eight wires (not shown) which are stripped and fitted to pins by crimping. The wires are passed through an airside backshell 50 and the pins are inserted into a complementary set of sockets (not shown) in the lower face of the free plug 51. The airside backshell 50 is formed in two parts: a body portion shown in FIGS. 10, 11 and an internally threaded collar (not shown). After the wires have been connected to sockets in the free plug 51, the collar is screwed onto an external thread (not shown) on the free plug 51, thus providing strain relief for the joint between the wires and the free plug 51.

The free plug 51 has a socket in its upper face which carries sockets (not shown) which are electrically connected to the electrical sockets in its lower face. The fixed connector 52 has a complementary set of pins in its lower face which are connected to the sockets in its upper face. The free plug 51 is push fitted to the fixed connector 52 and secured in place by a bayonet-fitting type collar (not shown) which engages with pins (not shown) extending from the fixed connector 52.

After the four connectors 40-43 have been fitted together as described above, the fuel side wall 22 is fitted to the body 20 of the connector box manhole.

The connectors 40-43 thus provide sealed interfaces between the fuel and airsides of the fuel side wall 22 of the connector box.

The installation is used only during flight testing of the aircraft. After flight testing, the installation can be replaced by a conventional manhole.

Although the invention has been described above with reference to one or more preferred embodiments, it will be appreciated that various changes or modifications may be made without departing from the scope of the invention as defined in the appended claims.

The invention claimed is:

1. An aircraft wiring installation connecting a set of fuel side wires in an aircraft fuel tank to a set of airside wires outside the fuel tank, the installation comprising: a connector box having a fuel side wall and an airside wall; one or more connectors carried by the fuel side wall which connect the fuel side wires to the airside wires; a fairing partially covering the airside wall; and one or more holes in the airside wall through which the airside wires pass from the connector box into the fairing.

2. The installation of claim 1 wherein the connector box is removably fitted in a wall of the aircraft fuel tank.

3. The installation of claim 2 wherein the connector box is a manhole and the airside wall has a minimum width which is greater than 200 mm.

4. The installation of claim 2 wherein the connector box is a manhole and the airside wall has a maximum width which is greater than 400 mm.

5. The installation of claim 1 wherein the fuel side wall of the connector box is detachably fitted to the rest of the connector box.

6. The installation of claim 1 wherein the fairing is a flap fairing.

7. The installation of claim 1 wherein the fuel side wires are connected to strain gauges in the fuel tank.

8. The installation of claim 1 wherein each connector connects the fuel side wires to the airside wires by a plug and socket fitting.

9. A method of connecting a set of fuel side wires in an aircraft fuel tank to a set of airside wires outside the fuel tank, the method comprising: fitting a connector box to a hole in the fuel tank, the connector box having a fuel side wall and an airside wall; connecting the airside wires to the fuel side wires using one or more connectors; fitting the connector(s) to the fuel side wall of the connector box; passing the airside wires through one or more holes in the airside wall of the connector box.; and fitting a failing which covers the hole(s) and the airside wires and partially covers the airside wall of the connector box.

10. The method of claim 9 further comprising fitting the fuel side wall to the rest of the connector box after connecting the airside wires to the fuel side wires and after fitting the connector(s) to the fuel side wall of the connector box.

11. A connector box for connecting a set of fuel side wires in an aircraft fuel tank to a set of airside wires outside the fuel tank, the connector box having a first wall and a second wall; one or more connectors carried by the first wall for connecting the fuel side wires to the airside wires; and one or more holes in the second wall through which the airside wires can pass from the connector box into a fairing.

12. The connector box of claim 11 wherein the second wall has a minimum width which is greater than 200 mm.

13. The connector box of claim 11 wherein the second wall has a maximum width which is greater than 400 mm.

14. The connector box of claim 11 wherein the first wall is detachably fitted to the rest of the connector box.

* * * * *